(12) United States Patent
Thomas et al.

(10) Patent No.: US 9,658,334 B2
(45) Date of Patent: May 23, 2017

(54) INTERIOR TRIM APPARATUSES FOR MOTOR VEHICLES INCLUDING ONE OR MORE INFRARED EMITTING DIODES AND ONE OR MORE INFRARED SENSORS

(71) Applicant: Faurecia Interior Systems, Inc., Auburn Hills, MI (US)

(72) Inventors: Louis Thomas, Auburn Hills, MI (US); Daniel Vander Sluis, Auburn Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 134 days.

(21) Appl. No.: 14/620,743

(22) Filed: Feb. 12, 2015

(65) Prior Publication Data
US 2016/0238707 A1 Aug. 18, 2016

(51) Int. Cl.
| | |
|---|---|
| *G01S 17/02* | (2006.01) |
| *H02J 7/00* | (2006.01) |
| *B60R 13/02* | (2006.01) |
| *B60R 11/02* | (2006.01) |
| *H02J 7/02* | (2016.01) |
| *G06F 3/01* | (2006.01) |
| *H02J 50/60* | (2016.01) |
| *G01S 7/481* | (2006.01) |

(52) U.S. Cl.
CPC ........... *G01S 17/026* (2013.01); *B60R 11/02* (2013.01); *B60R 13/02* (2013.01); *G06F 3/011* (2013.01); *G06F 3/017* (2013.01); *H02J 7/025* (2013.01); *H02J 50/60* (2016.02); *B60R 2013/0287* (2013.01); *G01S 7/4813* (2013.01)

(58) Field of Classification Search
CPC ....... G01S 17/02; G01S 17/026; B60R 13/04; B60R 13/02; H02J 7/025
USPC .......................................... 296/1.08; 320/108
See application file for complete search history.

(56) References Cited

U.S. PATENT DOCUMENTS

| | | | | |
|---|---|---|---|---|
| 5,040,168 A | * | 8/1991 | Maue | H04B 10/1149 398/1 |
| 5,494,328 A | * | 2/1996 | Lehr | B60J 3/0204 296/97.6 |
| 6,690,268 B2 | * | 2/2004 | Schofield | B60C 23/00 340/425.5 |
| 6,693,273 B1 | * | 2/2004 | O'Connor | G01S 17/026 250/221 |
| 6,902,284 B2 | * | 6/2005 | Hutzel | B60Q 3/023 248/479 |
| 7,491,366 B2 | * | 2/2009 | Tokhtuev | G01N 21/251 422/82.05 |
| 8,136,875 B2 | * | 3/2012 | Laake | B60N 2/4606 297/188.14 |
| 8,225,458 B1 | * | 7/2012 | Hoffberg | E05F 3/102 16/49 |
| 8,232,885 B2 | * | 7/2012 | Hoshino | G08B 17/107 250/574 |
| 8,727,413 B2 | * | 5/2014 | Seiller | B60R 11/00 296/24.34 |

(Continued)

*Primary Examiner* — M'Baye Diao
(74) *Attorney, Agent, or Firm* — Lorenz & Kopf LLP

(57) ABSTRACT

Interior trim apparatuses for motor vehicles are provided. In one example, an interior trim apparatus for a motor vehicle comprises one or more infrared (IR) light emitting diodes (LEDs). One or more IR sensors are cooperatively configured with the one or more IR LEDs to detect a presence of a nomadic device and/or a user input.

17 Claims, 7 Drawing Sheets

(56) References Cited

U.S. PATENT DOCUMENTS

| | | |
|---|---|---|
| 8,807,621 B2 | 8/2014 | Stephan |
| 8,976,156 B2 * | 3/2015 | Lee .................... G06F 3/0428 |
| | | 345/175 |
| 2008/0157940 A1 * | 7/2008 | Breed .................... B60C 11/24 |
| | | 340/425.5 |
| 2010/0148530 A1 * | 6/2010 | Michler .............. B29C 45/1418 |
| | | 296/1.08 |
| 2013/0093205 A1 | 4/2013 | Stephan |

* cited by examiner

INTERIOR TRIM APPARATUSES FOR MOTOR VEHICLES INCLUDING ONE OR MORE INFRARED EMITTING DIODES AND ONE OR MORE INFRARED SENSORS

TECHNICAL FIELD

The present disclosure relates generally to interior trim apparatuses for motor vehicles, and more particularly to interior trim apparatuses that include one or more infrared light emitting diodes and one or more infrared sensors cooperatively configured for detection to help improve provisions for nomadic devices.

BACKGROUND

In modern motor vehicles, provisions for stowing, charging, and/or using nomadic devices (e.g., portable consumer electronic devices, such as, for example, "smart" phones, tablets, digital music storage/player devices, hand-held navigation systems, and the like) are being provided with increasingly frequency. Often such provisions are arranged in the vehicle interior, and particularly in the area of the dashboard or instrument panel, and can include a mechanical support to hold such portable electronic devices in a "hand-free" manner.

In one example, disclosed in U.S. Pat. No. 8,807,621 issued to Stephan, a docking station for a portable electronic device such as a smart phone or a navigation device is provided as part of a storage compartment on an upper portion of an instrument panel. The docking station includes a device holder for securely retaining a mobile electronic device in an access position where it can be conveniently viewed and/or operated by vehicle occupants. A hardwired electronic communication interface or electrical connection may be provided between the mobile device in the vehicle by a cable or a direct plug-in connection. Unfortunately, further improvements in such provisions for nomadic devices are desirable such as the ability to detect the presence of one or more portable electronic devices in the docking station and whether or not the device(s) is properly positioned in the docking station, the ability to provide a user input to the device(s) and/or the interior trim apparatus, and/or the ability to provide wireless charging to the device(s) optimize, for example, based on the device's position in the docking station.

Accordingly, it is desirable to provide interior trim apparatuses for motor vehicles with improved provisions for nomadic devices. Furthermore, other desirable features and characteristics of the present disclosure will become apparent from the subsequent detailed description and the appended claims, taken in conjunction with the accompanying drawings and this background.

BRIEF SUMMARY

Interior trim apparatuses for motor vehicles are provided herein. In an exemplary embodiment, an interior trim apparatus for a motor vehicle comprises one or more infrared (IR) light emitting diodes (LEDs). One or more IR sensors are cooperatively configured with the plurality of IR LEDs to detect a presence of a nomadic device and/or a user input.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to interior trim apparatuses for motor vehicles. The exemplary embodiments taught herein provide an interior trim apparatus for a motor vehicle comprising one or more infrared (IR) light emitting diodes (LEDs) (e.g., a plurality of IR LEDs) and one or more IR sensors (e.g., a plurality of IR sensors) that are cooperatively configured with the one or more IR LEDs to detect a presence of a nomadic device and/or a user input. In an exemplary embodiment, the interior trim apparatus further comprises a docking arrangement for stowing the nomadic device and the one or more IR LEDs and the one or more IR sensors are disposed in or on the docking arrangement to advantageously facilitate detecting the presence of the nomadic device and optionally, the presence of any additional nomadic devices in the docking arrangement. Further, the one or more IR LEDs and the one or more IR sensors may be used to determine if the nomadic device is arranged in a proper orientation and/or identify its location in the docking arrangement. Advantageously, in an exemplary embodiment, having the nomadic device properly oriented in the docking arrangement allows the docking arrangement to properly lock or otherwise better secure the nomadic device to the docking arrangement so as to prevent the nomadic device from unintentionally becoming dislodged or separated from the docking arrangement. Additionally, identifying the particular location of the nomadic device in the docking arrangement can advantageously be used to optimize wireless charging of the nomadic device.

In an exemplary embodiment, the interior trim apparatus further comprising a dummy control panel. The dummy control panel may be, for example, a "placebo" or "non-functioning" decorative switch panel that forms part of the interior trim. The one or more IR LEDs and the one or more IR sensors are arranged to detect a user input provided by an occupant of the motor vehicle to the dummy control panel, for example, for communication to the nomadic device and/or the docking arrangement. As such, in an exemplary embodiment, advantageously the dummy control panel provides an interface for the occupant of the motor vehicle to communicate a user input without requiring any substantial mechanical and/or electrical hardware that would otherwise be required for a conventional control panel, thereby providing a cost-effective user interface for receiving a user input.

Figure 1:
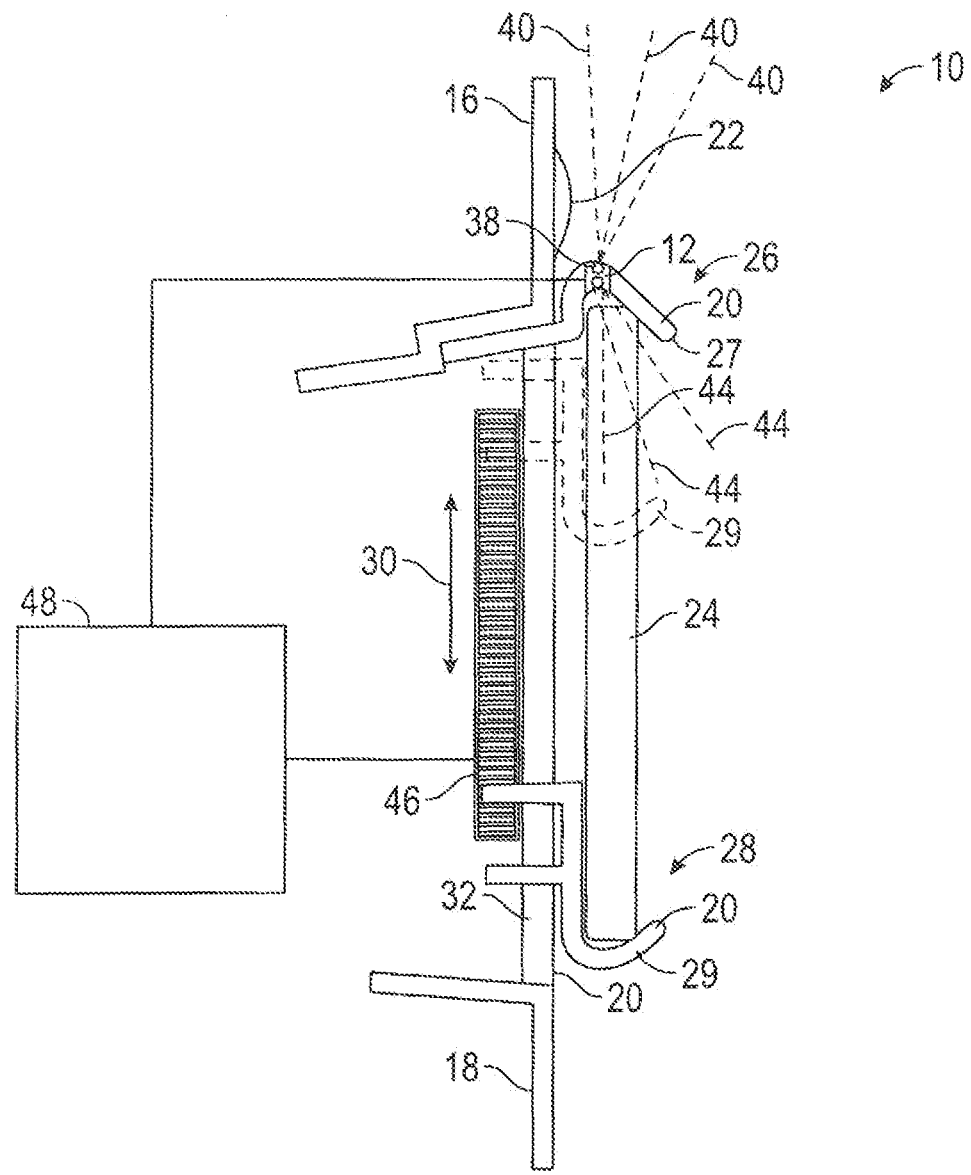
FIG. 1 is a sectional view of an interior trim apparatus for a motor vehicle in accordance with an exemplary embodiment.
Figure 4:
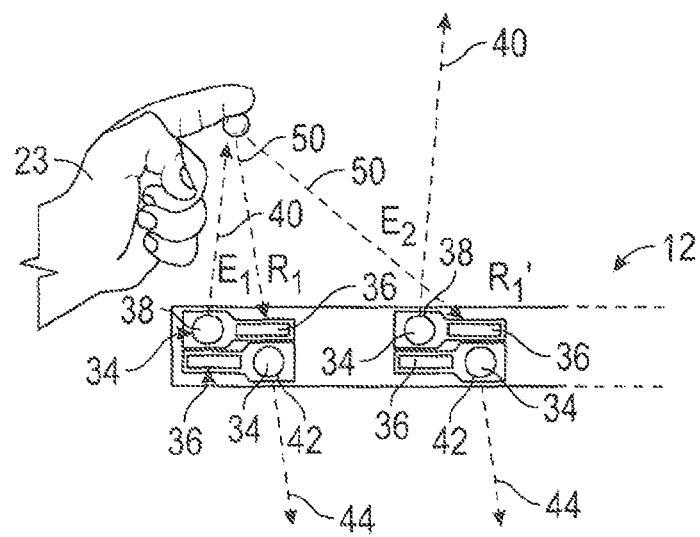
FIG. 4 is a partial front view of an embedded electronic interior trim apparatus including an IR LED-, sensor-array for a motor vehicle in accordance with another exemplary embodiment.

FIG. 1 is a sectional view of an interior trim apparatus 10 for a motor vehicle in accordance with an exemplary embodiment. FIG. 4 is a partial front view of the interior trim apparatus 10 depicted in FIG. 1 including an IR LED-, sensor-array 12. Referring to FIGS. 1 and 4, in an exemplary embodiment, the interior trim apparatus 10 may be positioned in, on, or otherwise proximate an instrument panel that can be positioned forward of a driver seat and a front passenger seat in an interior of the motor vehicle. Alternatively, the interior trim apparatus 10 may be positioned in, on, or otherwise proximate a door panel or any other interior vehicle trim panel.

As illustrated, the interior trim apparatus 10 comprises an interior trim panel upper section 16, an interior trim panel lower section 18, a docking arrangement 20 that is disposed between the interior trim panel upper and lower sections 16 and 18, and the IR LED-, sensor-array 12 that is disposed on or in the docking arrangement 20. In an exemplary embodiment and as will be discussed in further detail below, a dummy control panel 22 is formed in the interior trim panel upper section 16 for receiving a user input from an occupant 23 (e.g., driver or passenger) of the motor vehicle.

The docking arrangement 20 is for stowing a nomadic device 24 (e.g., a portable consumer electronic device, such as, for example, a "smart" phone, tablets, a digital music storage/player device, a hand-held navigation system, or other hand-held or relatively small electronic device). As illustrated, the docking arrangement 20 has an upper section 26 that includes a retaining member 27 (e.g., downward facing open hook section) and a lower section 28 that includes a retaining member 29 (e.g., upward facing open hook section). In an exemplary embodiment, the retaining members 27 and 29 are configured to move relative to each other along a substantially vertical axis (indicated by double headed arrow 30) in which the retaining member 27 is fixed against the interior trim panel upper section 16 while the retaining member 29 is configured to move relative to the retaining member 27 together with a docking support panel 32 between the interior trim panel upper and lower sections 16 and 18. As such, advantageously, the retaining members 27 and 29 can be moved relative to each other to receive, stow, and release the nomadic device 24.

In an exemplary embodiment, arranged in or on the retaining member 27 is the IR LED-, sensor-array 12. As illustrated, the IR LED-, sensor-array 12 comprises a plurality of IR LEDs 34 and a plurality of IR sensors 36 that are cooperatively arranged to detect a presence of the nomadic device 24 and/or a user input that is provided to the dummy control panel 22. In particular and as will be discussed in further detail below, in an exemplary embodiment, the IR LEDs 34 include a plurality of upward facing IR LEDs 38 for directing IR beams 40, at various angles, generally upwards towards the dummy control panel 22 for detecting a user input provided by the occupant 23 (e.g., driver or passenger) to the dummy control panel 22 and a plurality of downward facing IR LEDs 42 for directing IR beams 44, at various angles, generally downward towards the lower section 28 of the docking arrangement 20 for detecting the presence of the nomadic device 24 and optionally the presence of any other nomadic devices (as shown in FIGS. 8-10).

Figure 12A:
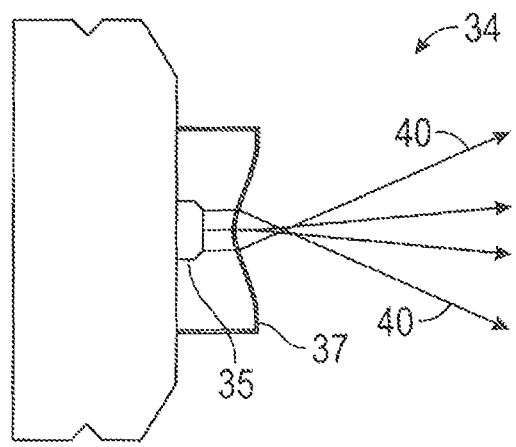
FIG. 12A is a cross-sectional view of an IR LED in accordance with an exemplary embodiment.
Figure 12B:
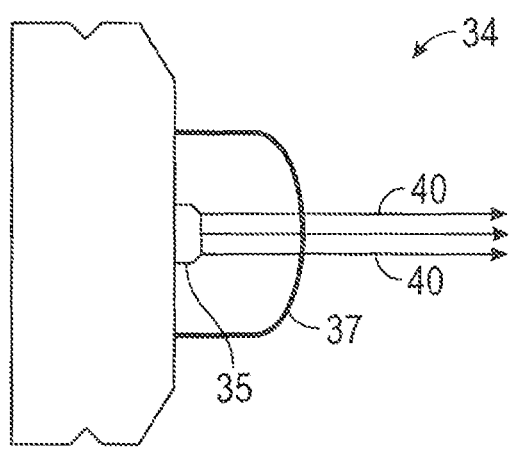
FIG. 12B is a cross-sectional view of an IR LED in accordance with an exemplary embodiment.

Referring also to FIGS. 12A and 12B, in an exemplary embodiment, each of the IR LEDs 34 comprises an IR LED light source 35 and a lens 37. Depending upon the shape of the lens 37, IR light generated from the IR LED light source 35 can be refracted to form IR beams 40 that are at different angles as illustrated in FIG. 12A, or alternatively, the IR light can be collimated to form IR beams 40 that are substantially parallel to each other as illustrated in FIG. 12B. As such, in an exemplary embodiment, producing the IR beams 40 at different angles can be accomplished, for example, using one or more of the IR LEDs 34 that face in substantially the same direction but by using the lens or lenses 37, for example, as illustrated in FIG. 12A, the IR light can be refracted at different angles, or alternatively, two or more of the IR LEDs 34 can face in substantially different directions but by using the lens or lenses 37, for example, as illustrated in FIG. 12B, to direct the respective collimated light from each of the IR LEDs at different angles.

Referring back to FIGS. 1 and 4, additionally and as will be discussed in further detail below, the interior trim apparatus 10 further comprises one or more docking station transmitting coils 46 that are disposed on or proximate the docking arrangement 20 such as along a backside of the docking support panel 32. As illustrated, an electronic control unit 48 is in communication with the IR LED-, sensor-array 12 and the docking station transmitting coil(s) 46. Advantageously, the electronic control unit 48 and the docking station transmitting coil 46 are cooperatively configured for transmitting energy to the nomadic device 24 for charging the nomadic device 24 during stowing in the docking arrangement 20.

Figure 8:
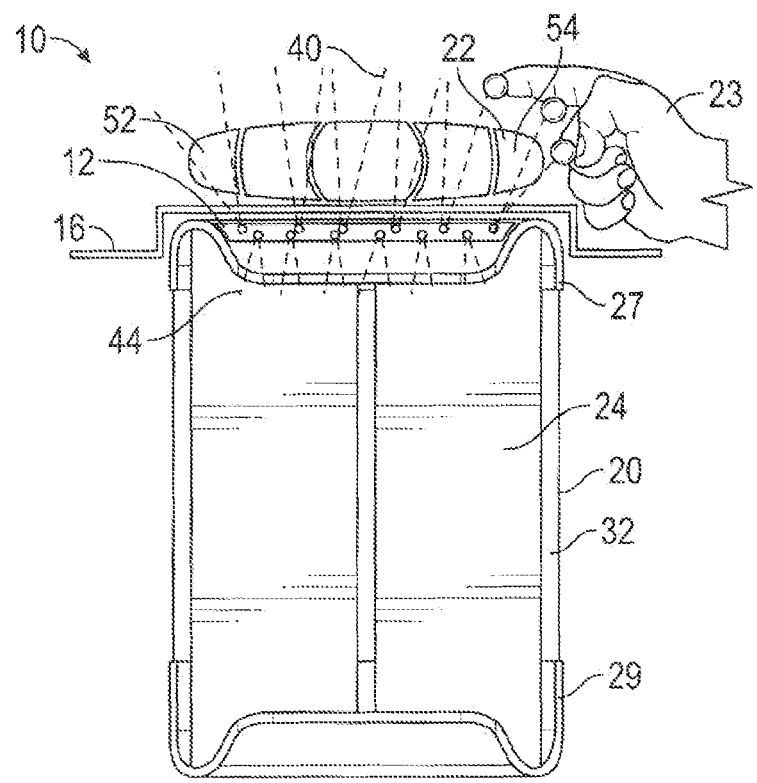
FIG. 8 is a front view of an interior trim apparatus for a motor vehicle in accordance with another exemplary embodiment.
Figure 9:
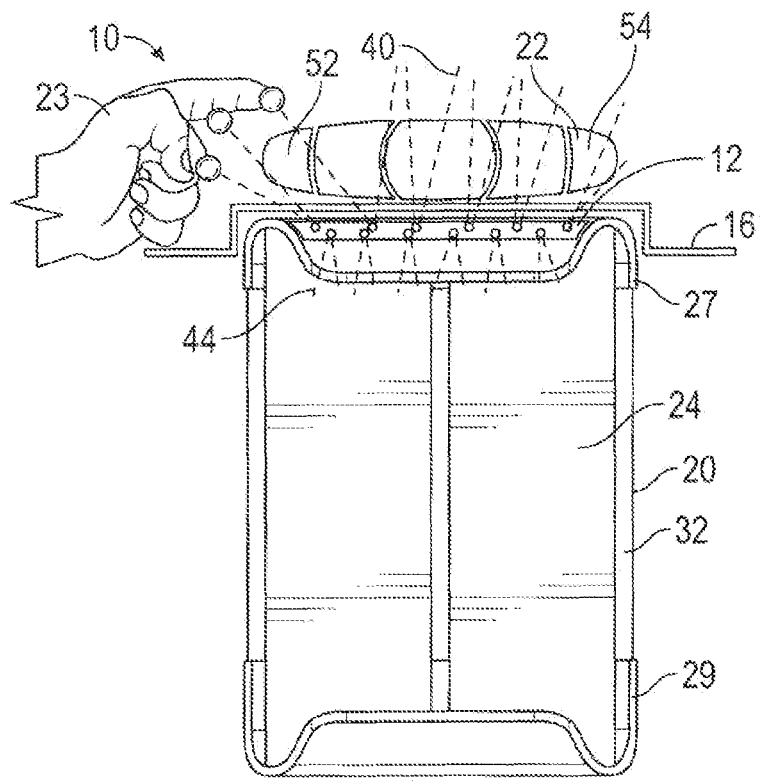
FIG. 9 is a front view of an interior trim apparatus for a motor vehicle in accordance with another exemplary embodiment.
Figure 10:
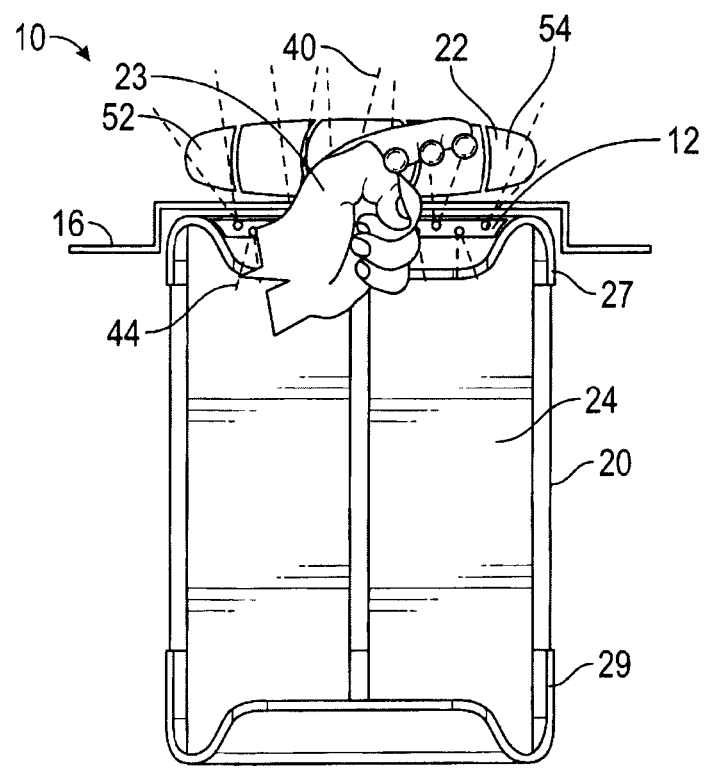
FIG. 10 is a front view of an interior trim apparatus for a motor vehicle in accordance with another exemplary embodiment.

Referring also to FIGS. 8-10, as illustrated and as discussed above, the IR beams 40 are directed generally upwards towards the dummy control panel 22 such that when part of the occupant 23 provides a user input to the dummy control panel 22, one or more of the IR beams 40 will reflect off the occupant 23 as a reflected IR beam(s) 50, which is received by one or more of the IR sensors 36. In response, the IR sensor(s) 36 provides a signal(s) to the electronic control unit 48, which is configured to analyze the signal(s) to determine the user input. For example, if the occupant 23 contacts a dummy control button 52 of the dummy control panel 22, as illustrated in FIG. 9 and which corresponds to a specific user input (e.g., charging the nomadic device(s) 24), versus contacting another dummy control button 54 of the dummy control panel 22, as illustrated in FIG. 10 and which corresponds to another specific user input (e.g., turning off the nomadic device(s) 24), the one or more reflected IR beams 50 will be received by the IR sensor(s) 36 to provide a signature signal(s) to the electronic control unit 48 that is evaluated to determine which dummy control button 52 or 54 was contacted in order to discern the specific user input. Additionally and as illustrated in FIGS. 8 and 10, in an exemplary embodiment, the one or more reflected IR beams 50 are received by the IR sensor(s) 36 to provide a signature signal(s) to the electronic control unit 48 for evaluation to determine if the occupant 23 is, for example, a driver that is position, for example, on a left side of the interior of the motor vehicle and as illustrated in FIG. 9, or alternatively, a passenger that is positioned, for example, on the right side of the interior of the motor vehicle and as illustrated in FIG. 8. Advantageously, this offers dedicated human machine interface (HMI) for the respective side occupant 23.

Figure 5:
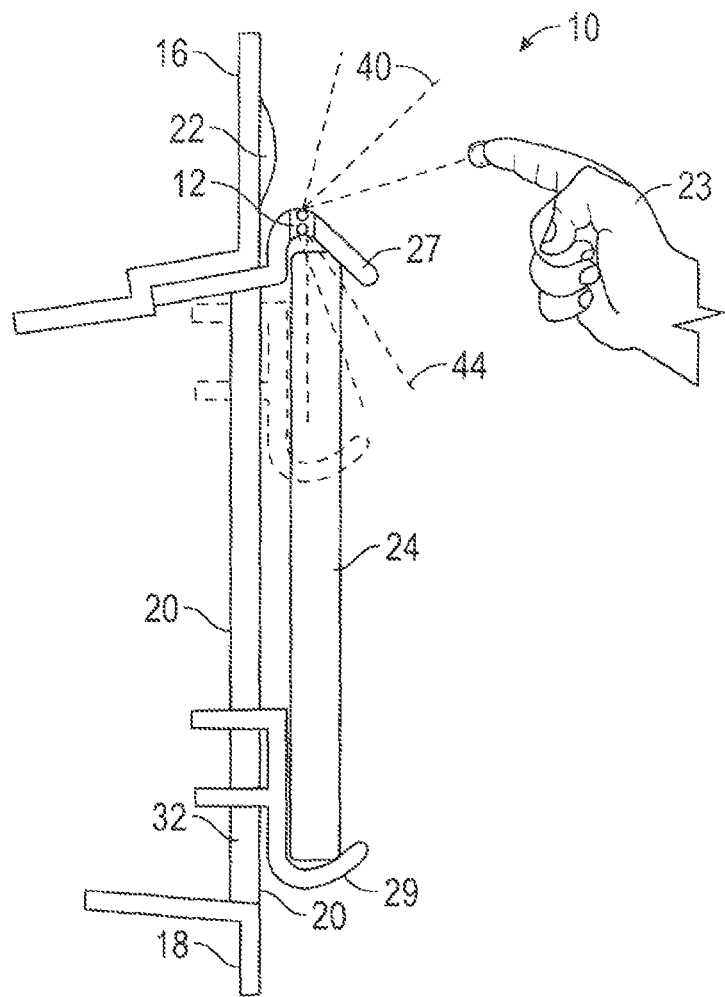
FIG. 5 is a sectional view of an interior trim apparatus for a motor vehicle in accordance with another exemplary embodiment.
Figure 6:
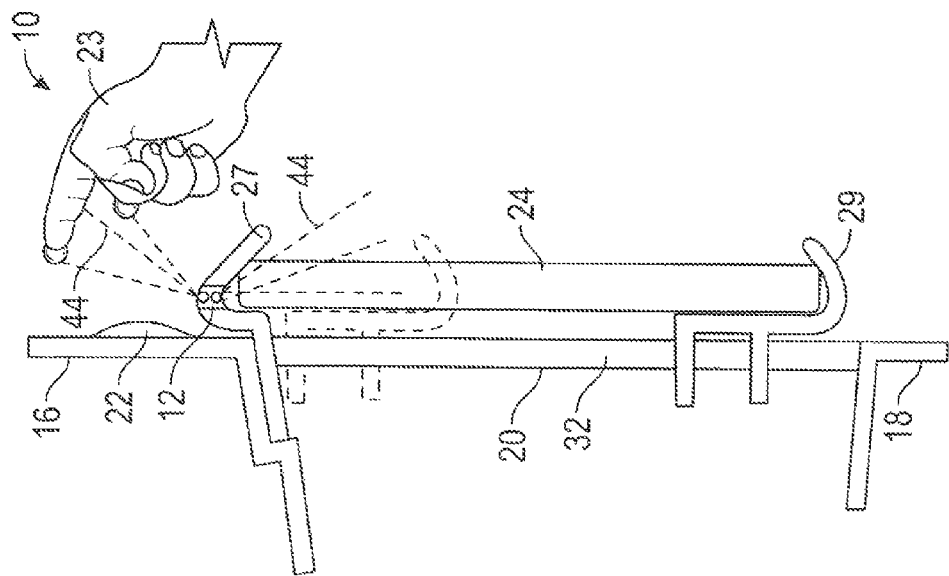
FIG. 6 is a sectional view of an interior trim apparatus for a motor vehicle in accordance with another exemplary embodiment.
Figure 7:
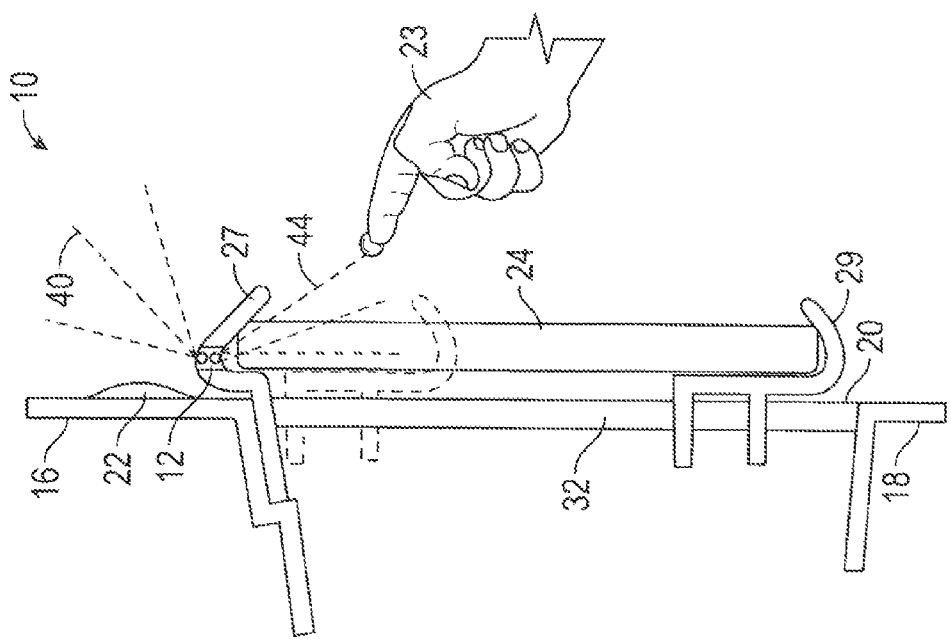
FIG. 7 is a sectional view of an interior trim apparatus for a motor vehicle in accordance with another exemplary embodiment.

Referring to FIGS. 1 and 4-7, in an exemplary embodiment, proximity detection of the occupant 23 moving proximate the interior trim apparatus 10 is provided. In one example, if part (e.g., hand) of the occupant 23 moves towards the dummy control panel 22 as illustrated in FIGS. 5 and 7, one or more of the IR beams 40 will reflect off the occupant 23 as one or more reflected IR beam(s) 50, which is received by one or more of the IR sensors 36 to provide a signature signal(s) to the electronic control unit 48 that is evaluated to identify that the occupant 23 is moving towards the dummy control panel 22. In another example, if part (e.g., hand) of the occupant 23 moves towards the docking arrangement 20 as illustrated in FIG. 6, one or more of the IR beams 44 will reflect off the occupant 23 as one or more reflected IR beam(s) 50, which is received by one or more of the IR sensors 36 to provide a signature signal(s) to the electronic control unit 48 that is evaluated to identify that the occupant 23 is moving towards the docking arrangement 20. Advantageously, proximity detection can be used to turn on or turn off various features, such as, for example, placing the nomadic device 24 into a sleep mode, waking up the nomadic device 24 from a sleep mode, turning on or off lights on the interior trim apparatus 10, and/or the like.

Figure 2:
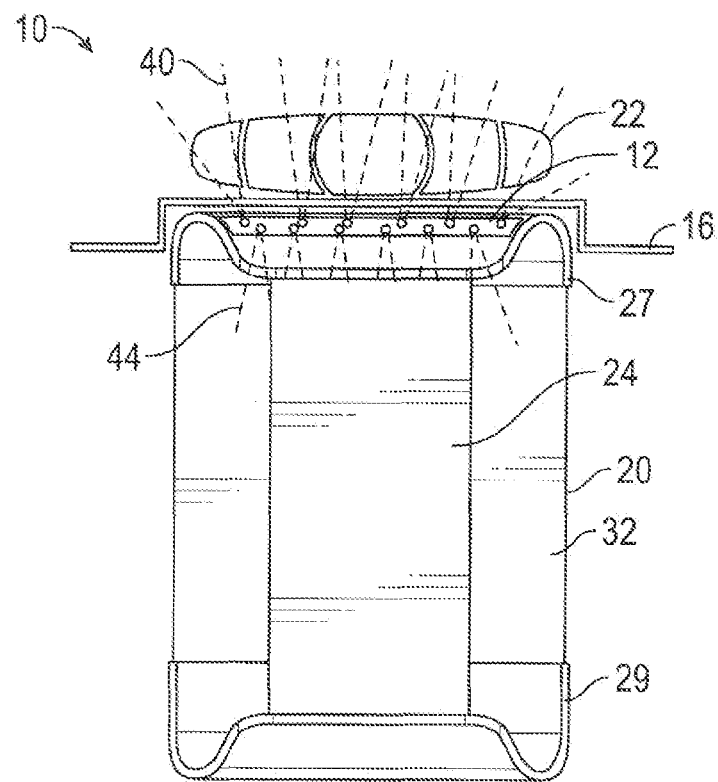
FIG. 2 is a front view of an interior trim apparatus for a motor vehicle in accordance with another exemplary embodiment.
Figure 3:
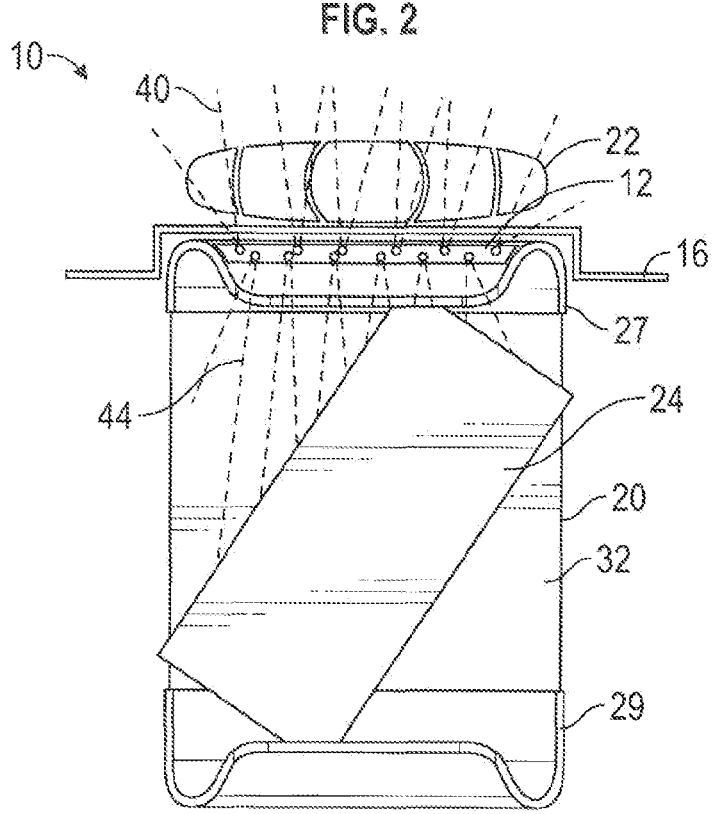
FIG. 3 is a front view of an interior trim apparatus for a motor vehicle in accordance with another exemplary embodiment.

Referring to FIGS. 1-4, in an exemplary embodiment, when the nomadic device 24 is present in the docking arrangement 20, one or more of the IR beams 44 will reflect off the nomadic device 24 (and any other additional nomadic devices 24 such as illustrated in FIGS. 8-10) as one or more reflected IR beam(s) 50, which is received by one or more of the IR sensors 36 to provide a signature signal(s) to the electronic control unit 48 for evaluation to determine not only that the nomadic device 24 is present but also whether or not the nomadic device 24 is in a proper orientation, e.g., predetermined proper orientation in which the upper and/or lower perimeter edge surfaces of the nomadic device 24 are parallel to and in contact with the retaining members 27 and/or 29, respectively, as illustrated in FIG. 2, or alternatively, that the nomadic device 24 is out of position, e.g., the upper and/or lower perimeter edge surfaces of the nomadic device 24 are not parallel to or are not in contact with the retaining members 27 and/or 29, respectively, relative to its proper orientation as illustrated in FIG. 3. Advantageously, in an exemplary embodiment, determining if the nomadic device 24 is arranged in a predetermined proper orientation in the docking arrangement 20 allows the nomadic device 24 to be locked securely in the docking arrangement 20 when the nomadic device 24 is properly oriented and to prevent locking of the nomadic device 24 in the docking arrangement 20 when the nomadic device 24 is not properly oriented in the docking arrangement.

Figure 11:
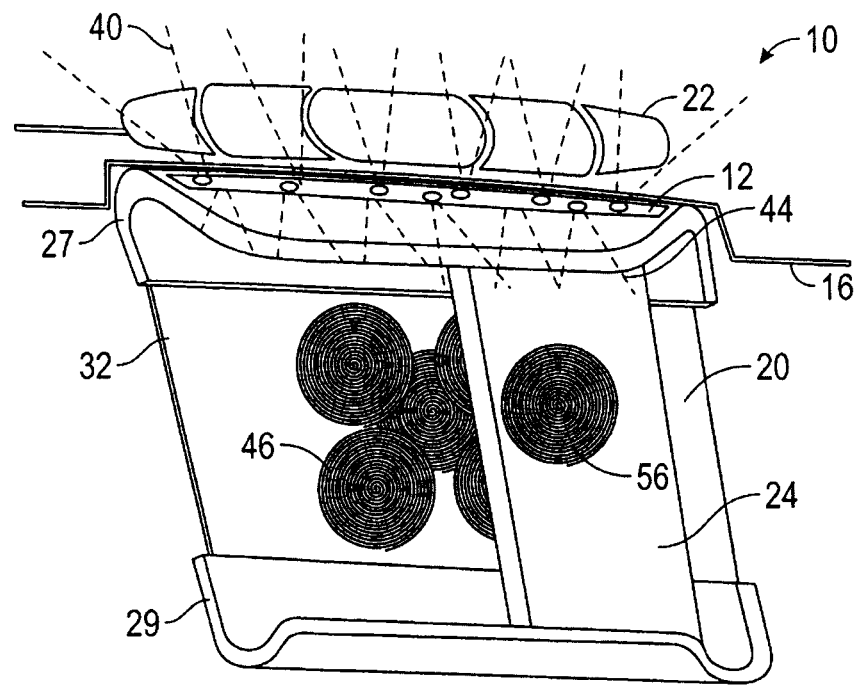
FIG. 11 is a perspective view of an interior trim apparatus for a motor vehicle in accordance with another exemplary embodiment.

Referring also to FIG. 11, in an exemplary embodiment, additionally the signature signal(s) resulting from the IR beams 44 reflecting off of the nomadic device 24 is evaluated by the electronic control unit 48 to identify the position or location of the nomadic device 24 in the docking arrangement 20 and/or one or more predetermined identifying attributes (e.g., size such as length, width, and/or thickness or the like) of the nomadic device 24 to identify the particular type, make, and/or model of the nomadic device 24. Advantageously, the electronic control unit 48 can process this information to optimize wireless charging of the nomadic device 24 by directing one or more of the docking station transmitting coils 46 that is most proximate a receiving coil 56 of the nomadic device 24 to transmit energy to the receiving coil 56 to optimally charge the nomadic device 24.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior trim apparatus for a motor vehicle comprising:
   one or more infrared (IR) light emitting diodes (LEDs);
   one or more IR sensors that are cooperatively configured with the one or more IR LEDs to detect a presence of a nomadic device and/or a user input; and
   a dummy control panel, wherein the one or more IR LEDs are configured to direct a first IR beam proximate the dummy control panel for detecting the user input provided by an occupant of the motor vehicle to the dummy control panel.

2. The interior trim apparatus of claim 1, wherein the one or more IR LEDs are configured to direct a second IR beam at a different angle than the first IR beam for proximity detection of a part of the occupant moving proximate the dummy control panel.

3. The interior trim apparatus of claim 1, wherein at least a portion of the one or more IR LEDs and at least a portion of the one or more IR sensors are arranged together to form an IR LED-, sensor-array, and wherein the dummy control panel is disposed above the IR LED-, sensor-array and the IR LED-, sensor-array is configured to direct the first IR beam generally upward.

4. The interior trim apparatus of claim 1, further comprising a docking arrangement for stowing the nomadic device, and wherein the one or more IR LEDs and the one or more IR sensors are disposed in or on the docking arrangement.

5. The interior trim apparatus of claim 4, further comprising:
   at least one docking station transmitting coil disposed on or proximate the docking arrangement; and
   an electronic control unit in communication with the one or more IR LEDs, the one or more IR sensors, and the at least one docking station transmitting coil, wherein the electronic control unit and the at least one docking station transmitting coil are cooperatively configured for transmitting energy to a receiving coil in the nomadic device for charging the nomadic device during stowing in the docking arrangement.

6. The interior trim apparatus of claim 4, wherein the one or more IR LEDs are configured to direct a first IR beam generally along and/or proximate the docking arrangement for detecting the presence of the nomadic device.

7. The interior trim apparatus of claim 6, wherein one or more IR LEDs are configured to direct a second IR beam at a different angle than the first IR beam for proximity detection of a part of an occupant of the motor vehicle moving proximate the docking arrangement.

8. The interior trim apparatus of claim 6, wherein the docking arrangement has an upper section and a lower section that is disposed under the upper section, wherein at least a portion of the one or more IR LEDs and at least a portion of the one or more IR sensors are arranged together to form an IR LED-, sensor-array that is disposed in or on the upper section of the docking arrangement, and wherein the IR LED-, sensor-array is configured to direct the first IR beam generally downward towards the lower section of the docking arrangement.

9. The interior trim apparatus of claim 8, wherein the docking arrangement comprises a first retaining member that is disposed in the upper section of the docking arrangement and a second retaining member that is disposed under the first retaining member, and wherein the first and second retaining members are configured to move relative to each other to receive and stow the nomadic device.

10. The interior trim apparatus of claim 6, wherein one or more of the one or more IR LEDs are used to determine if the nomadic device is arranged in a predetermined proper orientation in the docking arrangement.

11. The interior trim apparatus of claim 10, wherein the docking arrangement is configured to allow locking of the nomadic device in the docking arrangement when the nomadic device is arranged in the predetermined proper orientation.

12. The interior trim apparatus of claim 11, wherein the docking arrangement is configured to prevent locking of the nomadic device in the docking arrangement when the nomadic device is out of position relative to the predetermined proper orientation.

13. The interior trim apparatus of claim 6, wherein the one or more IR LEDs are used to determine the presence of any additional nomadic devices in the docking arrangement.

14. The interior trim apparatus of claim 6, wherein the one or more IR LEDs are used to identify one or more predetermined identifying attributes of the nomadic device.

15. The interior trim apparatus of claim 1, wherein the one or more IR LEDS and the one or more IR sensors are cooperatively configured to detect whether the user input was provided by a driver or a passenger of the motor vehicle.

16. An interior trim apparatus for a motor vehicle comprising:
one or more infrared (IR) light emitting diodes (LEDs);
one or more IR sensors that are cooperatively configured with the one or more IR LEDs to detect a presence of a nomadic device and/or a user input; and
a docking arrangement for stowing the nomadic device, and wherein the one or more IR LEDs and the one or more IR sensors are disposed in or on the docking arrangement,
wherein the one or more IR LEDs are configured to direct a first IR beam generally along and/or proximate the docking arrangement for detecting the presence of the nomadic device.

17. An interior trim apparatus for a motor vehicle comprising:
one or more infrared (IR) light emitting diodes (LEDs); and
one or more IR sensors that are cooperatively configured with the one or more IR LEDs to detect a presence of a nomadic device and/or a user input,
wherein the one or more IR LEDS and the one or more IR sensors are cooperatively configured to detect whether the user input was provided by a driver or a passenger of the motor vehicle.

\* \* \* \* \*